US012601929B2

(12) United States Patent
Si et al.

(10) Patent No.: US 12,601,929 B2
(45) **Date of Patent: *Apr. 14, 2026**

(54) CONTACT LENS

(71) Applicant: CooperVision International Limited, Fareham (GB)

(72) Inventors: Erwin C. Si, Alameda, CA (US); Nancy J. Keir, Pleasanton, CA (US); Yuwen Liu, Dublin, CA (US); Inna Maltseva, San Francisco, CA (US)

(73) Assignee: COOPERVISION INTERNATIONAL LIMITED, Fareham (GB)

( * ) Notice: Subject to any disclaimer, the term of this patent is extended or adjusted under 35 U.S.C. 154(b) by 414 days.

This patent is subject to a terminal disclaimer.

(21) Appl. No.: 18/130,434

(22) Filed: Apr. 4, 2023

(65) Prior Publication Data

US 2023/0350228 A1 Nov. 2, 2023

Related U.S. Application Data

(60) Provisional application No. 63/335,787, filed on Apr. 28, 2022.

(51) Int. Cl.

| | |
|---|---|
| ***G02C 7/04*** | (2006.01) |
| ***B29D 11/00*** | (2006.01) |
| ***G02B 1/04*** | (2006.01) |

(52) U.S. Cl.

CPC .......... *G02C 7/04* (2013.01); *B29D 11/00076* (2013.01); *B29D 11/00096* (2013.01);

(Continued)

(58) Field of Classification Search

CPC ...... G02C 7/04; G02C 7/049; G02C 2202/16; B29D 11/00076; B29D 11/00096;

(Continued)

(56) References Cited

U.S. PATENT DOCUMENTS

| | | | |
|---|---|---|---|
| 6,867,245 | B2 | 3/2005 | Wata et al. |
| 7,426,993 | B2 | 9/2008 | Coldrey et al. |

(Continued)

FOREIGN PATENT DOCUMENTS

| | | | |
|---|---|---|---|
| CN | 102239431 | A | 11/2011 |
| CN | 102574343 | A | 7/2012 |

(Continued)

OTHER PUBLICATIONS

Office Action issued in corresponding Taiwan Patent Application No. 112113055 issued Dec. 6, 2023 (with English translation) (9 pages).

(Continued)

*Primary Examiner* — Matthew Y Lee

(74) *Attorney, Agent, or Firm* — Kilyk & Bowersox, P.L.L.C.

(57) ABSTRACT

A contact lens having an amount of at least one cooling agent and at least one TRPV1 inhibitor releasably adhered is described as well as method of manufacturing the same. The contact lens can be comfortably worn by contact lens wearers and can increase the duration of comfortable lens wearing time and/or reduce lens awareness events and/or reduce contact lens dryness in a symptomatic contact lens wearer and further can reduce or avoid any stinging/burning sensation when the contact lens is first used or a short time thereafter.

32 Claims, 1 Drawing Sheet

(52) U.S. Cl.
CPC ........ *B29D 11/00192* (2013.01); *G02B 1/043* (2013.01); *G02C 7/049* (2013.01)

(58) Field of Classification Search
CPC ........ B29D 11/00192; B29D 11/00865; B29D 11/00038; B29D 11/00048; B29D 11/00067; G02B 1/043; G02B 1/18; G02B 1/10; A61K 47/34; A61K 9/0048; A61K 45/06; A61L 12/14; B29K 2083/00; B29K 2105/0061; B29K 2995/0092; A61P 27/02; A61P 27/04
See application file for complete search history.

(56) References Cited

U.S. PATENT DOCUMENTS

| | | | | |
|---|---|---|---|---|
| 8,231,218 | B2 | 7/2012 | Hong et al. | |
| 8,658,747 | B2 | 2/2014 | Liu et al. | |
| 8,865,789 | B2 | 10/2014 | Yao et al. | |
| 9,625,616 | B2 | 4/2017 | Liu et al. | |
| 10,028,920 | B2 | 7/2018 | Belmonte Martinez et al. | |
| 2009/0036554 | A1* | 2/2009 | Burke | A61L 12/143 514/779 |
| 2009/0312724 | A1 | 12/2009 | Pipkin et al. | |
| 2010/0140114 | A1 | 6/2010 | Pruitt et al. | |
| 2012/0128754 | A1 | 5/2012 | Wei | |
| 2012/0172486 | A1* | 7/2012 | Zhu | C08J 7/16 523/106 |
| 2013/0172440 | A1 | 7/2013 | Alli et al. | |
| 2014/0302146 | A1* | 10/2014 | Kurose | A61P 27/14 514/739 |
| 2017/0056335 | A1 | 3/2017 | Itoh et al. | |
| 2017/0105934 | A1 | 4/2017 | Mizutare et al. | |
| 2019/0179055 | A1* | 6/2019 | Qiu | B05D 5/00 |
| 2020/0306218 | A1 | 10/2020 | Galan Valdivia | |
| 2021/0315807 | A1* | 10/2021 | Wu | A61K 47/10 |
| 2022/0075210 | A1* | 3/2022 | Broad | G02C 7/108 |
| 2023/0172969 | A1* | 6/2023 | Ando | A61K 31/375 514/54 |
| 2023/0235247 | A1* | 7/2023 | Horn | C11D 3/2079 510/112 |

FOREIGN PATENT DOCUMENTS

| | | | |
|---|---|---|---|
| CN | 104114612 | A | 10/2014 |
| CN | 106163565 | A | 11/2016 |
| CN | 106456791 | A | 2/2017 |
| EP | 2014333 | A1 | 1/2009 |
| JP | 2016175887 | A | 10/2016 |
| JP | 2022022596 | A | 2/2022 |
| TW | 201446866 | A | 12/2014 |
| TW | 202100144 | A | 1/2021 |
| WO | 2014167611 | A1 | 10/2014 |

OTHER PUBLICATIONS

Manal Ahmad Abbas, "Modulation of TRPV1 channel function by natural products in the treatment of pain," Chemico-Biological Interactions, vol. 330, (2020) https://doi.org/10.1016/j.cbi.2020.109178 (22 pages).
Behrendt et al., "Characterization of the mouse cold-menthol receptor TRPM8 and vanilloid receptor type-1 VR1 using a fluorometric imaging plate reader (FLIPR) assay," British Journal of Pharmacology (2004) vol. 141, pp. 737-745.
Chalmers et al., "Contact Lens Dry Eye Questionnaire-8 (CLDEQ-8) and Opinion of Contact Lens Performance," Optometry and Vision Science, Oct. 10, 2012, vol. 89, No. 10, pp. 1435-1442.
Delgado et al., "Validation of Digital Visual Analog Scale Pain Scoring With a Traditional Paper-based Visual Analog Scale in Adults," Journal of the American Academy of Orthopaedic Surgeons, Glob Res Rev, Mar. 2018, vol. 2, No. 3 (6 pages).
Read et al., "Monitoring ocular discomfort using a wrist-mounted electronic logger," Contact Lens and Anterior Eye, (2020) https://doi.org/10.1016/j.clae.2020.02.010 (18 pages).
Young et al., "Characterizing contact lens-related dryness symptoms in a cross-section of UK soft lens wearers," Contact Lens & Anterior Eye, 2011, vol. 34, pp. 64-70.
Yu et al., "Modulation of TRP channels by resveratrol and other stilbenoids," Molecular Pain, 2013, vol. 9, No. 3 (11 pages).
International Search Report and Written Opinion issued in corresponding International Patent Application No. PCT/GB2023/050907 mailed Jul. 21, 2023 (13 pages).
Search and Examination Report issued in corresponding United Kingdom Patent Application No. GB2305079.2 dated Sep. 29, 2023 (7 pages).
PCT Demand filed Sep. 11, 2023 in corresponding International Patent Application No. PCT/GB2023/050907 (20 pages).
International Preliminary Report on Patentability issued in corresponding International Patent Application No. PCT/GB2023/050907 dated Oct. 25, 2023 (16 pages).
Office Action issued in corresponding Chinese Patent Application No. 202380013983.X issued Aug. 27, 2024 (with English translation) (12 pages).
Office Action issued in Chinese Patent Application 202380013983.X issued Oct. 17, 2025 (24 pages).

* cited by examiner

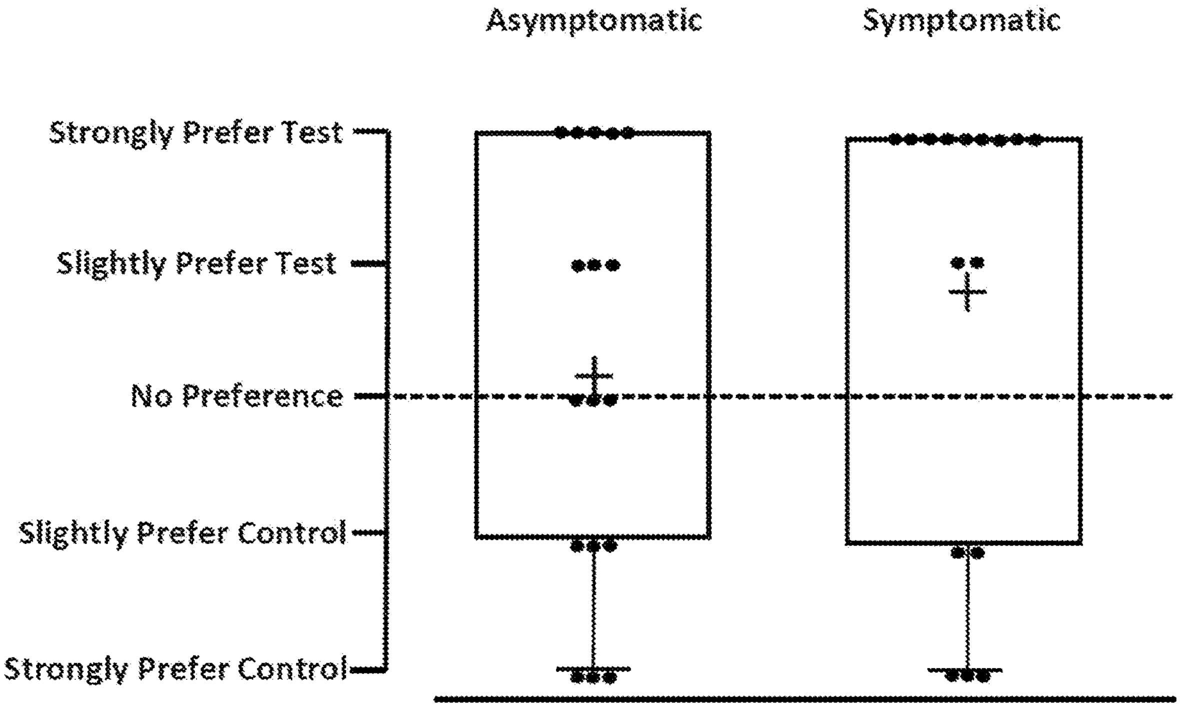
Asymptomatic
Symptomatic
Strongly Prefer Test
Slightly Prefer Test
No Preference
Slightly Prefer Control
Strongly Prefer Control

CONTACT LENS

FIELD OF THE INVENTION

This application claims the benefit under 35 U. S.C. § 119(e) of prior U.S. Provisional Patent Application No. 63/335,787, filed Apr. 28, 2022, which is incorporated in its entirety by reference herein.

The field of the invention relates to contact lenses, and particularly, to contact lenses that are more comfortable for symptomatic contact lens wearers.

BACKGROUND

An estimated 50% of all contact lens wearers experience discomfort while wearing their lenses, and approximately 25% of contact lens wearers permanently discontinue wearing lenses. Symptoms of ocular dryness is a primary reason for contact lens dissatisfaction. Despite advances in contact lens materials, there remains a need for improved contact lenses that can be comfortably worn by contact lens wearers who otherwise experience symptoms of ocular dryness while wearing contact lenses that are currently commercially available.

Furthermore, sensations of lens awareness are a primary reason for contact lens dissatisfaction in symptomatic contact lens wearers. Despite advances in contact lens materials, there remains a need for improved contact lenses that can be comfortably worn by contact lens wearers who otherwise experience sensations of lens awareness while wearing contact lenses that are currently commercially available.

The cornea is the most densely innervated tissue in the body and is exclusively innervated by A-delta and C primary afferent fibers. The C nerve fibers are non-myelinated; and while the A-delta fibers are slightly myelinated, they lose their myelin sheath after they enter the cornea to keep the cornea transparent. Thus, both types of nerve fibers have their nerve terminals exposed when they reach the squamous layer of the cornea. Located on these nerve terminals are receptors for sensing temperature, chemical, pain, and touch. A pain receptor (nociceptor) that is shown to be present on these nerve terminals is TRPV1.

In research by the inventors in providing solutions to symptomatic contact lens wearers, one technical issue that arose was that certain compositions used on the contact lens can ultimately provide a contact lens that can be comfortably worn by a symptomatic contact lens wearer but there can be an initial stinging/burning sensation when the contact lens is initially inserted into the eye. This stinging/burning sensation can cause a wearer not to use the contact lens at all even though stinging/burning sensation is temporary.

Thus, there is a need to provide a contact lens, especially for symptomatic contact lens wearers where the contact lens is treated such that the contact lens can be comfortably worn by the symptomatic lens wearers and further the possible stinging/burning sensation can be blocked or reduced.

SUMMARY

A feature of the present invention is to provide a contact lens (e.g., hydrogel contact lens) that can be comfortably worn by all contact lens wearers, including a symptomatic contact lens wearer.

A further feature of the present invention is to provide a contact lens (e.g., hydrogel contact lens) that can increase the duration of comfortable lens wearing time and/or reduce lens awareness events and/or reduce contact lens dryness in a symptomatic contact lens wearer and further can reduce or avoid any stinging/burning sensation when the contact lens is first used or a short time thereafter.

An additional feature of the present invention is to provide a contact lens that can release two agents, with one agent that can promote or provide or permit or contribute to an increase in the duration of comfortable lens wearing time and/or reduce lens awareness events and/or reduce contact lens dryness in a symptomatic contact lens wearer and a second agent that can promote or provide or permit or contribute to reducing or avoiding any stinging/burning sensation when the contact lens is first used or a short time thereafter.

Additional features and advantages of the present invention will be set forth in part in the description that follows, and in part will be apparent from the description, or may be learned by practice of the present invention. The objectives and other advantages of the present invention will be realized and attained by means of the elements and combinations particularly pointed out in the description and appended claims.

To achieve these and other advantages, and in accordance with the purposes of the present invention, as embodied and broadly described herein, the present invention, in part relates to a contact lens having an amount of at least one cooling agent and at least one TRPV1 inhibitor releasably adhered.

The present invention further relates to an unworn sterile hydrogel contact lens immersed in a packaging solution and sealed in a package. The contact lens includes a) a polymeric lens body; b) an amount of at least one cooling agent releasably adhered to the polymeric lens body; and c) an amount of at least one TRPV1 inhibitor either releasably adhered to the polymeric lens body or present in the packaging solution or both.

Further, the present invention relates to use of the unworn sterile hydrogel contact lens of the present invention for correcting vision, especially the vision of a symptomatic contact lens wearer.

In addition, the present invention relates to a method of manufacturing the contact lens of the present invention. The method includes polymerizing polymerizable composition in a contact lens mold to obtain the polymeric lens body; removing the polymeric lens body from the contact lens mold; extracting (in one or more steps) the polymeric lens body in at least a first organic solvent comprising the cooling agent, the TRPV1 inhibitor, or both; hydrating the polymeric lens body in a hydration liquid to obtain a hydrogel contact lens; sealing the hydrogel contact lens with packaging solution in a package; and autoclaving the package.

Further, the present invention relates to use of the unworn sterile hydrogel contact lens of the present invention for correcting vision, especially the vision of a symptomatic contact lens wearer, wherein any stinging/burning sensation from the cooling agent is blocked or reduced by at least one TRPV1 inhibitor.

It is to be understood that both the foregoing general description and the following detailed description are exemplary and explanatory only and are intended to provide a further explanation of the present invention, as claimed.

The accompanying drawing is incorporated in and constitute a part of this application and illustrate some of the features of the present invention. The drawing, together with the description, serve to explain the principles of the present invention.

BRIEF DESCRIPTION OF THE DRAWING

FIG. 1 is a box plot showing symptomatic and asymptomatic contact lens wearers preference for either a WS12-releasing contact lens or a control lens after 30 days of lens wear.

DETAILED DESCRIPTION

The cornea is the most densely innervated tissue in the body and is exclusively innervated by A-delta and C primary afferent fibers. The C nerve fibers are nonmyelinated; and while the A-delta fibers are slightly myelinated, they lose their myelin sheath after they enter the cornea to keep the cornea transparent. Thus, both types of nerve fibers have their nerve terminals exposed when they reach the squamous layer of the cornea. Located on these nerve terminals are receptors for sensing temperature, chemical, pain, and touch. It was discovered that an agent (i.e., cooling agent) interacting with receptors for sensing temperature (TRPM8), when embedded in contact lenses, improves end-of day dryness and/or reduces CLDEQ-8 score after 30 days of wear. However, for some subjects, there is an initial stinging/burning sensation at insertion that decreases but may not disappear at the end of the 30-day period. Thus, it was discovered that an agent (i.e., a TRPV1 inhibitor) interacting with receptors sensitive to physical and chemical stimuli (TRPV1), when embedded in contact lenses, reduces reports of foreign body sensation upon insertion and has the ability to reduce or eliminate any stinging/burning sensation.

A hypothesis is that the stinging/burning sensation with use of a cooling agent such as a TRPM8 agonist is associated with pain sensation relayed through TRPV1 to the central nervous system. By incorporating a TRPV1 inhibitor into the lens together with a cooling agent, the stinging/burning sensation is blocked or reduced.

By using these two agents, together, to address both targets, leveraging their different release characteristics, the stinging/burning sensation can be addressed with the TRPVI inhibitor and the cooling agent improving contact lens comfort at insertion and throughout the entire day.

The present invention, in part, relates to contact lenses (e.g., hydrogel contact lenses), uses for the contact lenses, and methods of making the contact lenses. One or more cooling agents are present in and/or on the lenses such that the one or more cooling agents are released from the lens during wear in amounts that improve the comfort of contact lens wear, especially in symptomatic contact lens wearers. One or more TRPV1 inhibitors are additionally present (with the cooling agent(s)) in and/or on the lenses such that the one or more TRPV1 inhibitors are released from the lens during wear in amounts that can prevent or reduce any stinging/burning sensation that the wearer may experience when the contact lens is first used or a short time thereafter. A 'short time thereafter' can be, for example, within the first hour of use (e.g., within the first hour from the time that the contact lens is first inserted into the eye). This time can be within the first 30 minutes, or within the first 15 minutes, or within the first 10 minutes, or within the first 5 minutes, or within the first minute, or within 30 seconds of the contact lens being initially inserted in the eye.

The present invention, in part, relates to an unworn sterile contact lens (e.g., hydrogel contact lens) immersed in a packaging solution and sealed in a package (e.g., blister package). The preferred contact lens, namely, a hydrogel contact lens is discussed hereafter but it is to be understood that the present invention can be applicable to other contact lens types.

The unworn hydrogel contact lens can comprise, consist essentially of, consists of, or include a) a polymeric lens body; b) an amount of at least one cooling agent releasably adhered to the polymeric lens body; and c) an amount of at least one TRPV1 inhibitor either releasably adhered to the polymeric lens body or present in the packaging solution or both.

As used herein, the term "cooling agent" refers to a physiological coolant, i.e. a compound that exerts an action at or near nerve endings associated with the sensation of cooling. The term "a cooling agent" or "the cooling agent" encompasses one or more cooling agents. The cooling agent can be a mixture of two or more cooling agents that are loaded together into or onto the contact lens body. Two or more cooling agents can be separately loaded into or onto the contact lens body.

The cooling agent, as used herein, is an agent that can be releasably adhered to a contact lens and has the ability to provide improved comfort in symptomatic contact lens wearers. As described herein, various methods are described/provided to determine improvement in symptomatic contact lens wearers (e.g., reducing symptoms of dryness in the contact lens wearer, and/or increasing comfortable lens wearing time by the contact lens wearer, and/or increasing tear meniscus height of the contact lens wearer, and/or lowering CLDEQ-8 scores in the contact lens wearer, and/or lowering VAS scores in the contact lens wearer).

The cooling agent is capable of being loaded into or onto the contact lens body such that the cooling agent is releasably adhered to the lens body and released during wear. The release can be over a time period such that a release profile is achieved.

Examples of the cooling agent include, but are not limited to, icilin, menthol, a menthol derivative, a carboxamide, WS-148, WS-30, WS-11, CPS-113, CPS-369, frescolat ML, frescolat MGA, Cooling-agent 10, PMD-38, geraniol, linalool, eucalyptol, hydroxy-citronellal, AG3-5, 5-methyl-4-(1-pyrrolidinyl)-3[2H]-furanone, 4,5-methyl-3-(1-pyrrolidinyl)-2-[5H]-furanone, vanillyl butyl ether, peppermint oil, methane carboxamide ethyl pyridine, menthoxypropanediol, menthanediol, cyanomethylphenyl menthane carboxamide, camphor, ethyl menthane carboxamide, menthyl diisopropyl propionamide, menthyl lactate, 4-(butoxymenthyl)-2-methoxy-phenol, 3-[[5-methyl-2-(1-methyl)cyclohexyl]oxy]-1,2-propanediol, isopulegol, or any mixture or combinations thereof. The cooling agents are generally commercially available.

The menthol can be natural menthol or a synthetic menthol.

The menthol derivative can be a racemic menthol derivative, a menthol isomer such as neomenthol, isomenthol, neoisomenthol, cornmint oil, or racemic and isomers of synthetic menthol-like cooling agents that can include monomenthol succinate (MMS), menthol ethylene glycol carbonate, menthol propylene glycol carbonate, menthone glycerol ketal, menthol lactate, 3-(1-menthoxy) propane 1-2 diol (MPD), Cooling agent 10, TK-10, 3-(1-menthoxy)-2-methylpropane-1-2-diol, 3-(1-menthoxy)ethanol (Coolact 5), 3-(1-menthoxy)propan-1-ol, 3-(1-menthoxy)-butan-1-ol, lsoupulegol (Coolact P), p-menthane-3,8 diols (Coolact 380, PMD38), menthone glycerol ketal (Frescolat MGA), menthyl lactate (Frescolat ML), (2S)-3-(1-methoxy)-propane-1-2 diol (MPD, TK10), methyl-3-hydroxybuterate (MHB), menthyl pyrrolidin-2-one-5-carboxylate (Questice), 6-isopropyl-9-dimethyl-1-4-dioxaspiro [4,5]decan-2-one, or Cubebol, DL-pyrrolidin-2-one carboxylic acid.

Carboxamide cooling agents include, but are not limited to, alkyloxy amides of the p-menthane carboxamide series of coolant molecules, D-Ala-O-Me and D-Ala-O-Et, N-(R)-2-oxotetrahydrofuran-3-yl(1R,2S5R)-p-menthane-3-carboxamide (D-HSL), N-ethyl-p-menthane-3-carboxamide (WS-3), 2-isorpropyl-trimethylbutyarmide (WS-23), N-([ethoxycarbonlyl)methyl]methyl)-p-methane-3-carboxamide (WS-14), ethyl-(p-menthane-3-carboxamido)acetate (WS-5), N,N-dimethyl menthyl succinamide, or N-(2-ethoxyethyl)-2-isopropyl-2,3-dimethylbutanamide, (1R,2S, 5R)-N-(4-Methoxyphenyl)-p-menthanecarboxamide (also referred to as N-(4-Methoxyphenyl)-5-methyl-2-(1-methylethyl)cyclohexanecarboxamide (CAS No. 68489-09-8) (WS-12).

Additional examples of cooling agents include, but are not limited to, vanillyl butyl ether, peppermint oil, methane carboxamide ethyl pyridine, menthoxypropanediol, menthanediol, cyanomethylphenyl menthane carboxamide, camphor, ethyl menthane carboxamide, menthyl diisopropyl propionamide, menthyl lactate, 4-(butoxymenthyl)-2-methoxy-phenol, 3-[[5-methyl-2-(1-methyl)cyclohexyl] oxy]-1,2-propanediol, isopulegol, or any mixtures thereof.

In one example, the cooling agent is WINSENSE Extra 500 manufactured by Lyondell Basell of Rotterdam, the Netherlands. which is a mixture of ethyl menthane carboxamide, menthyl diisopropyl propionamide, and menthyl lactate.

The cooling agent can be or include a TRPM8 agonist.

The cooling agent can be present in the polymeric lens body in an amount such that the cooling agent has an in vitro release of 0.01 µg to 10 µg or more of the cooling agent after 1 hour. As used herein, the amount of active agent (e.g., cooling agent or TPV1 inhibitor) released from a polymeric lens body in vitro at a given time point or over a series of time points (i.e., a "release profile") is determined using a release media consisting of 25 vol. % ethanol (EtOH) in phosphate buffered saline (PBS) (hereinafter "in vitro release media") and the method described in Example 3 (hereinafter "in vitro release method"). The in vitro release after 1 hour can be from 0.01 µg to 10 µg, or 0.02 µg to 10 µg, or 0.05 µg to 10 µg, or 0.075 µg to 10 µg, or 0.1 µg to 10 µg, or 0.5 µg to 10 µg, or 0.75 µg to 10 µg, or 1 µg to 10 µg, or 2 µg to 10 µg, or 3 µg to 10 µg, or 5 µg to 10 µg. Other amounts above or below any one or more of these ranges is an option.

The amount of the cooling agent releasably adhered to the polymeric lens body can from about 0.10 µg to 100 µg or more. As used herein, an amount of an active agent "releasably adhered" to a polymeric lens body refers to the cumulative amount of active agent that releases from the polymeric lens body after 16 hours using the in vitro release method. The amount of cooling agent releasably adhered to the polymeric lens body may be from about 0.10 µg to 100 µg or more, or from about 0.25 µg to 10 µg or more, or from about 0.5 µg to 5 µg, or from 0.10 µg to 9 µg, or from 0.10 µg to 8 µg, or from 0.10 µg to 7 µg, or from 0.10 µg to 6 µg, or from 0.10 µg to 5 µg, or from 0.10 µg to 4 µg, or from 0.10 µg to 3 µg, or from 0.5 µg to 10 µg, or from 0.7 µg to 10 µg, or from 1 µg to 10 µg, or from 2 µg to 10 µg, or from 3 µg to 10 µg, or from 4 µg to 10 µg or other amounts above or below any of the ranges presented here.

With respect to the TRPV1 inhibitor, the TRPV1 inhibitor can be one or more TRPV1 inhibitors. The term "a TRPV1 inhibitor" or "the TRPV1 inhibitor" encompasses one TRPV1 inhibitor or encompasses more than one TRPV1 inhibitor used together. The TRPV1 inhibitor can be a mixture of two or more TRPV1 inhibitors that are loaded together into or onto the contact lens body. Two or more TRPV1 inhibitors can be separately loaded into or onto the contact lens body.

As an option, the TRPV1 inhibitor can be loaded onto or into the contact lens after the cooling agent is loaded onto or into the same lens. Thus, a sequential loading procedure can permit the TRPV1 inhibitor to release earlier and/or release in a greater amount when the contact lens is initially inserted into the eye.

As an option, the TRPV1 inhibitor can be loaded onto or into the contact lens simultaneously with the cooling agent.

The TRPV1 inhibitor can provide inhibition by direct blocking of TRPV1 or indirect inhibition such as by down-regulating TRPV1 expression.

As an option, the TRPV1 can be a TRPV1 antagonist.

The TRPV1 inhibitor is capable of being loaded into or onto the contact lens body such that the TRPV1 inhibitor is releasably adhered to the lens body and released during wear.

Examples of the TRPV1 inhibitor include, but are not limited to, oleic acid, alpha-lipoic acid, L-carnitine, resveratrol (3,5,4'-trihydroxy-trans-stilbene), hyaluronic acid, palmitoylethanolamide, petroselinic acid, naringenin, asivatrep, AMG517 (from Amgen), ABT102 (from Abbott), GRC 6211 (from Glenmark), SB-705498 (from GSK), or MK-2295 (from Merck-Neurogen), or any mixtures or any combinations thereof.

Amgen

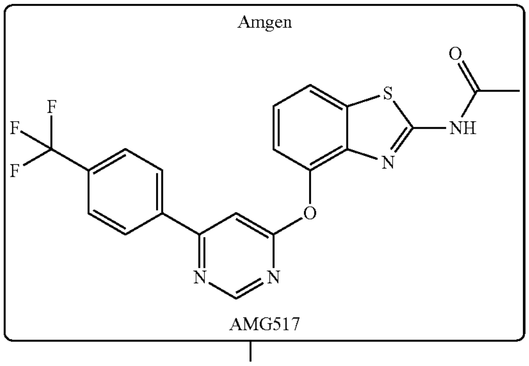

AMG517

Glenmark

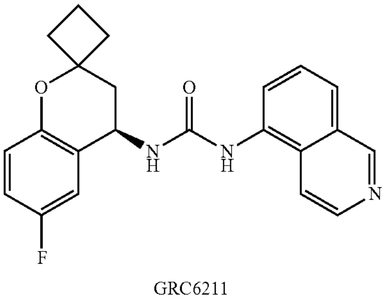

GRC6211

-continued

Abbot

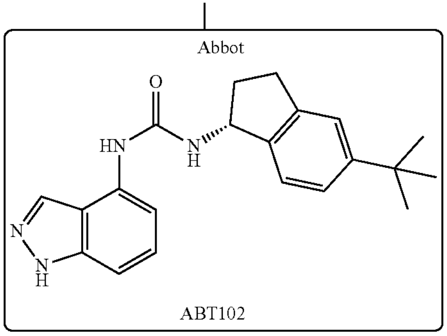

ABT102

GSK

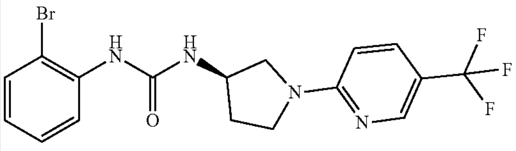

SB-704598

Merck-Neurogen

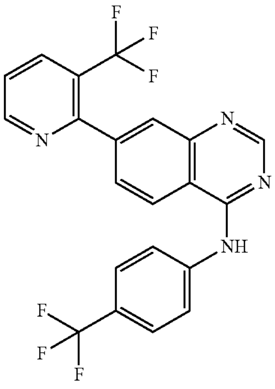

MK-2295

The TRPV1 inhibitor can be present in the lens body in an amount such that the TRPV1 inhibitor has an in vitro release of 1 μg to 100 ug (or more) TRPV1 inhibitor after 1 hour. The in vitro release after 1 hour can be from 3 μg to 25 μg , 4 μg to 25 μg, 5 μg to 25 μg, 7 μg to 25 μg , 10 μg to 25 μg, 12 μg to 25 μg, 2 μg to 22 μg , 2 μg to 20 μg, 2 μg to 18 μg, 2 μg to 15 μg , 2 μg to 12 μg, 2 μg to 10 μg, 2 μg to 8 μg, 2 μg to 5 μg. Other amounts above or below any one or more of these ranges is an option.

The amount of the TRPV1 inhibitor releasably adhered to the polymeric lens body can be from about 5 μg to 500 μg or more, or from about 10 μg to 500 μg, or from 20 μg to 500 μg, or from 30 μg to 500 μg, or from 50 μg to 500 μg, or from 75 μg to 500 μg, or from 100 μg to 500 μg, or from 125 μg to 500 μg, or from 150 μg to 500 μg, or from 175 μg to 500 μg, or from 200 μg to 500 μg, or from 5 μg to 450 μg, or from 5 μg to 400 μg, or from 5 μg to 300 μg, or from 5 μg to 200 μg to 100 μg or other amounts above or below any of the ranges presented here.

Examples of specific combinations of the cooling agent and the TRPV1 inhibitor can be where the cooling agent is or includes a TRPM8 agonist and the TRPV1 inhibitor comprises or includes oleic acid.

Another example is where the cooling agent comprises or includes or is WS12 and the TRPV1 inhibitor comprises or includes or is oleic acid.

With the present invention, the TRPV1 inhibitor can have a first release profile and the cooling agent can have a second release profile. The first release profile can be different from the second release profile. The first release profile can be faster than the second release profile, based on the percent of releasably adhered amount of the TRPV1 inhibitor released in an initial 1 to 3 hours (e.g., one hour or 30 minutes), as determined using the in vitro release method, and based on the percent of releasably adhered amount of the cooling agent released after the same time period (e.g., one hour or 30 minutes). Thus for example, if the amount of TRPV1 inhibitor releasably adhered to a polymeric lens body is 40 μg, of which 30 μg (i.e., 75%) releases after 1 hour using the in vitro release method described in Example 3, and the amount of cooling agent releasably adhered to the polymeric lens body is 400 μg of which 40 μg (i.e., 10%) releases after 1 hour using the in vitro release method, the TRPV1 inhibitor is said to have a faster release profile than the cooling agent.

Thus, as an example, the TRPV1 inhibitor can release 50 wt % to 99 wt % (e.g., 50 wt % to 90 wt % or 50 wt % to 80 wt % or 50 wt % to 70 wt %) of the amount of TRPV1 inhibitor releasably adhered to the contact lens in the initial 1 to 3 hours of release (as determined using the in vitro release method of Example 3) compared to 5 wt % to 50 wt % (e.g., 5 wt % to 45 wt %, or 5 wt % to 40 wt %, or 5 wt % to 30 wt %, or 5 wt % to 20 wt % or 5 wt % to 10 wt %) of the amount of cooling agent releasably adhered to the same contact lens during the same initial 1 to 3 hours of release.

Thus, in one example, the first release profile releases a majority (based on weight %) of the releasably adhered amount of the TRPV1 inhibitor in the initial 1 to 3 hours of release (e.g., one hour or 30 minutes) and the second release profile releases less than a majority (based on weight %) of the releasably adhered amount of the cooling agent in the same initial 1 to 3 hours of release (e.g., one hour or 30 minutes).

The first release profile (the TRPV1 inhibitor release profile) can be a release of from 3 to 20 μg of the TRPV1 inhibitor per hour for up to at least 9 hours in the release media (e.g., from 1 to 9 hours, or from 3 to 8 hours).

The second release profile (the cooling agent release profile) can be a release of 0.05 μg to 0.5 μg of the cooling agent per hour for up to 6 hours, or the second release profile can be a release of 0.1 μg to 0.3 μg of the cooling agent per hour for up to 6 hours.

As an option, the polymeric lens body has a concave surface and convex surface, and the TRPV1 inhibitor is present on the concave surface or convex surface or both at a greater concentration compared to the cooling agent. For example, the concave surface can have a coating (or a layer) that includes the TRPV1 inhibitor and the coating can permit the initial release of the TRPV1 inhibitor but initially block or impede or reduce or slow-down the initial release of the cooling agent (e.g., when the contact lens is first inserted into the eye).

With respect to the cooling agent(s), the cooling agent(s) can be incorporated into hydrogel contact lens materials and remain within the lens material, preferably without degradation and/or preferably without leaching during standard contact lens sterilization and storage conditions.

Once the contact lens is placed on an eye, the cooling agent(s) can continuously release from the lens over a time period. As one example, a cooling agent is continuously released from the lens for up to 6 hours, or 8 hours, or 12 hours, or 16 hours or more.

With respect to the TRPV1 inhibitor(s), the TRPV1 inhibitor(s) can be incorporated into hydrogel contact lens materials and remain within the lens material, preferably without degradation and/or preferably without leaching during standard contact lens sterilization and storage conditions.

Once the contact lens is placed on an eye, the TRPV1 inhibitor(s) can continuously release from the lens in amounts sufficient to inhibit TRPV1 receptors over a time period, such as 30 minutes or more or one to several hours, such as from 30 minutes to 3 hours or 1 hour to 2 hours.

The cooling agent can optionally have the ability to activate transient receptor potential melastatin-8 (TRPM8) ion channels.

As an option, the contact lens has no other TRPM8 receptor agonist present except the cooling agent.

As an option, the contact lens has no other agent for ocular dryness present.

With respect to the polymeric contact lens body that has an amount of the cooling agent and an amount of the TRPV1 inhibitor releasably adhered to the polymeric lens body, the polymeric lens body can be a reaction product of a polymerizable composition that comprises or includes at least one siloxane monomer and at least one hydrophilic monomer or at least one hydrophilic polymer or both at least one hydrophilic monomer and at least one hydrophilic polymer.

The polymeric lens body can be one of: fanfilcon A, comfilcon A, somofilcon A, riofilcon A, or stenfilcon A.

As a further example, the contact lens can be a reaction product of a polymerizable composition for a non-silicone hydrogel. Non-silicone hydrogel contact lenses are typically formed from polymerization of one or more hydrophilic monomers such as 2-hydroxyethyl methacrylate (HEMA) or vinyl alcohol, optionally in combination with other monomers, and contains no siloxane molecule.

A cured polymeric lens body may be extracted in an extraction solvent (or two or more extraction solvents) containing the cooling agent and/or TRPV1 inhibitor which results in the desired amount of the cooling agent and TRPV1 inhibitor adhering to the polymeric lens body. As an example, an extraction solvent may be an organic solvent such as EtOH. The extraction solvent may consist of EtOH (with or without the cooling agent and/or TRPV1 inhibitor added). Alternatively an extraction solvent may comprise a mixture of an organic solvent and water (with or without the cooling agent and/or TRPV1 inhibitor added), such as a 50/50 (by vol) mixture of denatured EtOH and deionized water.

Alternatively, or additionally, a polymeric lens body for a hydrogel may be hydrated in a hydration liquid such as water or an aqueous solution (or two or more hydration liquids) containing the cooling agent and/or TRPV1 inhibitor which results in the desired amount of the cooling agent and TRPV1 inhibitor adhering to the polymeric lens body.

Alternatively, or additionally, the cooling agent and/or TRPV1 inhibitor may be added to the polymerizable composition prior to polymerization to form the polymeric lens body. The cooling agent and/or TRPV1 inhibitor may be adhered to the polymeric lens body by hydrophobic interaction, and/or may be physically entrapped by the polymer network of the polymeric lens body.

A polymeric lens body made of one material and having a certain amount of cooling agent and/or TRPV1 inhibitor releasably adhered to a polymeric lens body may have different release profiles than a polymeric lens body made of a different material but having the same amount of cooling agent and/or TRPV1 inhibitor releasably adhered thereto. Some properties of the polymeric lens body that may affect the cooling agent and/or TRPV1 inhibitor release profile include the hydrophobicity of the material, the water content, and the degree of cross-linking of the polymeric lens body. Additionally, encapsulation technologies, such as liposomes or erodible nanoparticles, may be used to encapsulate a portion or all of the cooling agent and/or TRPV1 inhibitor prior to incorporating it into the polymeric lens body to delay or extend release of cooling agent and/or TRPV1 inhibitor from the lens. For instance, from 10 wt % to 80 wt % or more of the cooling agent and/or TRPV1 inhibitor incorporated into the contact lens can have this delayed release property. A contact lens is considered to sustain release of cooling agent and/or TRPV1 inhibitor for a certain number of hours, x, when the amount of cooling agent and/or TRPV1 inhibitor released after x hours is greater than the amount of cooling agent and/or TRPV1 inhibitor released after x−1 hour, when measured using the in vitro release method as described in Example 3.

The method of Example 2 can be used to determine the amount of cooling agent and/or TRPV1 inhibitor released from a contact lens when worn. Briefly, human subjects (n=3) wear the lens in both eyes for a specified period of time. The amount of cooling agent and/or TRPV1 inhibitor released from the lens at the specified time point is the difference between the average amount of cooling agent and/or TRPV1 inhibitor in the unworn lens (n=3) and the average amount of cooling agent and/or TRPV1 inhibitor remaining in the worn lens at the time point tested.

The polymeric lens body may comprise any hydrogel material suitable for use as a contact lens material. A silicone hydrogel material for contact lenses is typically formed by curing a polymerizable composition (i.e., a monomer mixture) comprising at least one siloxane monomer and at least one hydrophilic monomer or at least one hydrophilic polymer, or a combination thereof. As used herein, the term "siloxane monomer" is a molecule that contains at least one Si—O group and at least one polymerizable group. Siloxane monomers used in contact lens compositions are well-known in the art (see, e.g., U.S. Pat. Nos. 8,658,747 and 6,867,245). (All patents and publications mentioned here and throughout are incorporated in their entirety by reference.) In some examples, the polymerizable composition comprises a total amount of siloxane monomer of at least 10 wt. %, 20 wt. %, or 30 wt. % up to about 40 wt. %, 50 wt. %, 60 wt. %, or 70 wt. %. Unless specified otherwise, as used herein, a given weight percentage (wt. %) of a component of the polymerizable composition is relative to the total weight of all polymerizable ingredients and IPN polymers (as described further below) in the polymerizable composition. The weight of the polymerizable composition contributed by components, such as diluents, that do not incorporate into the final contact lens product are not included in the wt. % calculation.

In a specific example, the polymerizable composition comprises a hydrophilic vinyl monomer. As used-herein, a "hydrophilic vinyl monomer" is any siloxane-free (i.e., contains no Si—O groups) hydrophilic monomer having a polymerizable carbon-carbon double bond (i.e., a vinyl group) present in its molecular structure that is not part of an acryl group, where the carbon-carbon double bond of the vinyl group is less reactive than the carbon-carbon double bond present in a polymerizable methacrylate group under free radical polymerization. As used herein, the term "acryl group" refers to the polymerizable group present in acrylate, methacrylates, acrylamides, etc. Thus, while carbon-carbon double bonds are present in acrylate and methacrylate groups, as used herein, such polymerizable groups are not considered to be vinyl groups. Further, as used herein, a monomer is "hydrophilic" if at least 50 grams of the monomer are fully soluble in 1 liter of water at 20° C. (i.e., ~5% soluble in water) as determined visibly using a standard shake flask method. In various examples, the hydrophilic vinyl monomer is N-vinyl-N-methylacetamide (VMA), or N-vinyl pyrrolidone (NVP), or 1,4-butanediol vinyl ether (BVE), or ethylene glycol vinyl ether (EGVE), or diethylene glycol vinyl ether (DEGVE), or any combination thereof. In one example, the polymerizable composition comprises at least 10 wt. %, 15 wt. %, 20 wt. %, or 25 wt. % up to about 45 wt. %, 60 wt. %, or 75 wt. % of a hydrophilic vinyl monomer. As used herein, a given weight percentage of a particular class of component (e.g., hydrophilic vinyl monomer, siloxane monomer, or the like) in the polymerizable composition equals the sum of the wt. % of each ingredient in the composition that falls within the class. Thus, for example, a polymerizable composition that comprises 5 wt. % BVE and 25 wt. % NVP and no other hydrophilic vinyl monomer, is said to comprise 30 wt. % hydrophilic vinyl monomer. In one example, the hydrophilic vinyl monomer is a vinyl amide monomer. Exemplary hydrophilic vinyl amide monomers are VMA and NVP. In a specific example, the polymerizable composition comprises at least 25 wt. % of a vinyl amide monomer. In a further specific example, the polymerizable composition comprises from about 25 wt. % up to about 75 wt. % of VMA or NVP, or a combination thereof. Additional hydrophilic monomers that may be included in the polymerizable composition are N,N-dimethylacrylamide (DMA), 2-hydroxyethyl methacrylate (HEMA), ethoxyethyl methacrylamide (EOEMA), ethylene glycol methyl ether methacrylate (EGMA), and combinations thereof.

In addition, or as an alternative to a hydrophilic monomer, the polymerizable composition may comprise a non-polymerizable hydrophilic polymer, which results in a polymeric lens body comprising an interpenetrating polymer network (IPN) with the non-polymerizable hydrophilic polymer interpenetrating the silicone hydrogel polymer matrix. In this example, the non-polymerizable hydrophilic polymer is referred to as an IPN polymer, which acts as an internal wetting agent in the contact lens. In contrast, polymer chains within the silicone hydrogel network that form by polymerization of monomers present in the polymerizable composition are not considered to be IPN polymers. The IPN polymer may be a high molecular weight hydrophilic polymer, for example from about 50,000 to about 500,000 Daltons. In a specific example, the IPN polymer is polyvinylpyrrolidone (PVP). In other examples, the polymerizable composition is substantially free of polyvinyl pyrrolidone or other IPN polymer.

As an option, one or more non-silicon containing hydrophobic monomers can be present as part of the polymerizable composition. A hydrophobic monomer can be understood to be any monomer for which 50 grams of the monomer are not visibly fully soluble in 1 liter of water at 20° C. using a standard shake flask method. Examples of suitable hydrophobic monomers include methyl acrylate, or ethyl acrylate, or propyl acrylate, or isopropyl acrylate, or cyclohexyl acrylate, or 2-ethylhexyl acrylate, or methyl methacrylate (MMA), or ethyl methacrylate, or propylmethacrylate, or butyl acrylate, or 2-hydroxybutyl methacrylate, or vinyl acetate, or vinyl propionate, or vinyl butyrate, or vinyl valerate, or styrene, or chloroprene, or vinyl chloride, or vinylidene chloride, or acrylonitrile, or 1-butene, or butadiene, or methacrylonitrile, or vinyltoluene, or vinyl ethyl ether, or perfluorohexylethylthiocarbonylaminoethyl methacrylate, or isobornyl methacrylate (IBM), or trifluoroethyl methacrylate, or hexafluoroisopropyl methacrylate, or tetrafluoropropyl methacrylate, or hexafluorobutyl methacrylate, or any combinations thereof.

The hydrophobic monomer, if used, can be present in the reaction product of the polymerizable composition in amounts of from 1 wt. % to about 30 wt. %, such as from 1 wt. % to 25 wt. %, from 1 wt. % to 20 wt. %, from 1 wt. % to 15 wt. %, from 2 wt. % to 20 wt. %, from 3 wt. % to 20 wt. %, from 5 wt. % to 20 wt. %, from 5 wt. % to 15 wt. %, from 1 wt. % to 10 wt. %, based on the total weight of the polymerizable composition.

As will be appreciated by those skilled in the art, the polymerizable composition may comprise additional polymerizable or non-polymerizable ingredients conventionally used in contact lens formulations such as one or more of a polymerization initiator, a UV absorbing agent, a tinting agent, an oxygen scavenger, a chain transfer agent, or the like. In some examples, the polymerizable composition may include an organic diluent in an amount to prevent or minimize phase separation between the hydrophilic and hydrophobic components of the polymerizable composition, so that an optically clear lens is obtained. Diluents commonly used in contact lens formulations include hexanol, ethanol, and/or other alcohols. In other examples, the polymerizable composition is free or substantially free (e.g., less than 500 ppm) of an organic diluent. In such examples, the use of siloxane monomers containing hydrophilic moieties such as polyethylene oxide groups, pendant hydroxyl groups, or other hydrophilic groups, may make it unnecessary to include a diluent in the polymerizable composition. Non-limiting examples of these and additional ingredients that may be included in the polymerizable composition are provided in U.S. Pat. No. 8,231,218.

Non-limiting examples of silicone hydrogels that may be used include comfilcon A, fanfilcon A, stenfilcon A, senofilcon A, senofilcon C. somofilcon A, narafilcon A, delefilcon A, narafilcon A, lotrafilcon A, lotrafilcon B, balafilcon A, samfilcon A, galyfilcon A, and asmofilcon A.

A specific example of a silicone hydrogel contact lens of the present invention is one that is based on a polymerizable composition comprising from 25 wt. % to 55 wt. % of a siloxane monomer or a combination of siloxane monomers, from 30 wt. % to 55 wt. % of a vinyl monomer selected from NVP, VMA, or combinations thereof, and optionally from about 1 wt. % to about 20 wt. % of a hydrophilic monomer selected from N,N-dimethylacrylamide (DMA), 2-hydroxyethyl methacrylate (HEMA), ethoxyethyl methacrylamide (EOEMA), or ethylene glycol methyl ether methacrylate (EGMA), or any combination thereof, and optionally from about 1 wt. % to about 20 wt. % of a hydrophobic monomer selected from methyl methacrylate (MMA), isobornyl methacrylate (IBM), or 2-hydroxybutyl methacrylate (HOB) or any combination thereof.

Silicone hydrogel materials made from this specific embodiment of polymerizable composition include stenfilcon A, comfilcon A, somofilcon A, fanfilcon A, and enfilcon A.

Conventional methods can be used to manufacture the contact lens of the invention. As an example, a polymerizable composition for a silicone hydrogel composition is dispensed into a female mold member having a concave surface that defines the front surface of the contact lens. A male mold member having a convex surface that defines the back surface of the contact lens, i.e., the cornea-contacting surface, is combined with the female mold member to form a contact lens mold assembly that is subjected to curing conditions, such as UV or thermal curing conditions, under which the curable composition is formed into a polymeric lens body. The female and male mold members can be non-polar molds or polar molds. The mold assembly is disassembled (i.e., demolded) and the polymeric lens body is removed from the mold and contacted with a solvent, for instance, an organic solvent, such as ethanol, to extract unreacted components from the lens body. In some examples, an extraction liquid may comprise an organic solvent mixed with water. After extraction, the lens body is hydrated in one or more hydration liquids such as water or an aqueous solution and packaged. In some examples, extraction and hydration can be achieved without organic solvents. Exemplary methods of manufacturing silicone hydrogel contact lenses are described in U.S. Pat. No. 8,865,789.

As indicated, the cooling agent and/or TRPV1 inhibitor may be loaded into the polymeric lens during an extraction and/or hydration step. For example, after curing, the polymeric lens body is swelled in an extraction solvent, such as ethanol, which contains the cooling agent and/or TRPV1 inhibitor. When the extracted polymeric lens body is subsequently placed in a hydration solution, such as deionized water, the extraction solvent is removed, and the cooling agent and/or TRPV1 inhibitor remains adhered to the polymeric lens body.

The loading of the cooling agent and/or TRPV1 inhibitor during an extraction step can occur a number of ways. Both the cooling agent and TRPV1 inhibitor can be loaded during the same, single extraction or hydration step, where both the cooling agent and TRPV1 inhibitor are present together in same extraction or hydration liquid.

Alternatively, or additionally, the extraction can comprise two or more extraction steps. When multiple extraction steps are used, a first extraction step can include the cooling agent in a first extraction solvent and a second extraction step can include the TRPV1 inhibitor in a second extraction solvent. The order of extractions can be reversed as an option. The first extraction solvent and the second extraction solvent can be the same or different from each other.

The extraction solvent can be an organic solvent. The first extraction solvent can be a first organic solvent and the second extraction solvent can be a second organic solvent (that is different from the first organic solvent). As an option, one or more extraction solvent may comprise a mixture of an organic solvent and water, such as a mixture of such as a 50/50 (by vol) mixture of denatured EtOH and deionized water.

Alternatively, or additionally, the cooling agent and/or TRPV1 inhibitor can be loaded by way of being present in packaging solution (e.g., blister solution) prior to sealing the contact lens with packaging solution in a base member.

Some TRPV1 inhibitors are more suited to be loaded into or onto the contact lens during extraction with an organic solvent (e.g., oleic acid, alpha-lipoic acid, palmitoylethanolamide, petroselinic acid) and others are more suited to be loaded by way of being present in an aqueous hydration liquid or packaging (i.e., blister) solution (e.g., L-carnitine, hyaluronic acid, naringenin) and still others can be loaded in acceptable amounts using extraction and/or blister loading techniques (e.g., resveratrol). Simple routine experiments and/or an understanding of the solubility of the TRPV1 inhibitor in water can be used to determine suitability of the loading technique.

The present invention thus relates to a method of manufacturing the contact lens of the present invention. The method can comprise, consist essentially of, or include polymerizing a polymerizable composition in a contact lens mold to obtain the polymeric lens body, and removing the polymeric lens body from the contact lens mold; and then extracting (in one or more steps) the polymeric lens body in at least a first organic solvent(s) comprising the cooling agent, the TRPV1 inhibitor, or both. The method includes hydrating the polymeric lens body in a hydration liquid to obtain a hydrogel contact lens and sealing said hydrogel contact lens with packaging solution in a package; and autoclaving the package. The extracting step can comprise extracting the polymeric lens body in the first organic solvent comprising the cooling agent and the TRPV1 inhibitor. Or, the extracting step can comprise extracting the polymeric lens body in the first organic solvent comprising the cooling agent and then extracting in a second organic solvent comprising the TRPV1 inhibitor (or vice versa). The method can further comprise including, for instance, the TRPV1 inhibitor in the packaging solution prior to the sealing. In lieu of the extracting step and loading step or in addition to loading via the above-described extracting step (s), one or both of the cooling agent and/or TRPV1 inhibitor can be loaded by being present in the packaging solution.

Examples of the extraction solvents and hydration liquids used in an extraction and hydration process can consist of denatured ethanol, a 50/50 (by vol) mixture of denatured ethanol and deionized water, and deionized water. As an example, the extraction and hydration process can involve at least one extraction step in denatured ethanol followed by a 50:50 mixture of ethanol water followed by at least one hydration step in deionized water, and wherein each extraction and hydration step can last from about 15 minutes to about 3 hours at a temperature of from about 20° C. and to about 30° C. For example, an extraction solvent can contain WS12 or other cooling agent to achieve uploading of the WS12 or other cooling agent to the polymeric lens body.

Any extraction solvent used as an uploading solution for the cooling agent and/or TRPV1 inhibitor can contain a concentration of cooling agent and/or TRPV1 inhibitor of at least 0.25 μg/ml. or at least 0.5 μg/ml. or at least 1.0 μg/ml. This concentration can be at least 2.5 μg/ml, at least 5.0 μg/ml, or at least 10.0 μg/ml cooling agent and/or TRPV1 inhibitor. In one example, the concentration of either the cooling agent and/or TRPV1 inhibitor (or both) in the extraction solvent is from about 1.0 μg/ml to about 1.5 mg/ml (i.e., 1 ppm to about 1500 ppm).

In some examples, the cooling agent and/or TRPV1 inhibitor, once adhered to the polymeric lens body is stable and does not substantially release from the polymeric lens body or degrade during autoclaving of the sealed contact lens package that contains the unworn hydrogel contact lens in a packaging solution, or during storage in its packaging solution, but does release during lens wear. Thus, the packaging solution that the contact lens is immersed in, before autoclaving, or immediately after autoclaving, or after 1 day thereafter, or after 30 days thereafter, or after 60 days thereafter, or after 120 days thereafter has a concentration of cooling agent and/or TRPV1 inhibitor that is less than 0.1 μg/ml or less than 0.05 μg/ml or has a concentration of cooling agent and/or TRPV1 inhibitor that is less than the level of detection as determined by HPLC.

As part of the present invention, the contact lens can be sealed in a contact lens package. The packaging solution sealed within the contact lens package may be any conventional contact-lens compatible solution. In one example, the packaging solution comprises, consists, or consists essentially, of an aqueous solution of a buffer, and/or a tonicity agent. In another example, the packaging solution contains additional agents such as one or more additional antimicrobial agents, and/or a comfort agent, and/or a hydrophilic polymer, and/or a surfactant and/or other beneficial agent. In some examples, the packaging solution may comprise polysaccharides (e.g., hyaluronic acid, hydroxypropyl methylcellulose, hydroxypropyl cellulose, hydroxyethyl cellulose, etc.) or other high molecular weight polymers, such as polyvinyl pyrrolidone, which are commonly used as comfort polymers or thickening agents in ophthalmic solutions and contact lens packaging solutions. In other examples, the packaging solution may comprise an ophthalmic drug. The packaging solution can have a pH in the range of about 6.8 or 7.0 up to about 7.8 or 8.0. In one example, the packaging solution comprises phosphate buffer or borate buffer. In another example, the packaging solution comprises a tonicity agent selected from sodium chloride or sorbitol in an amount to maintain osmolality in the range of about 200 to 400 mOsm/kg, and typically from about 270 mOsm/kg up to about 310 mOsm/kg.

With respect to the contact lens package, this package can include or comprise a base member (e.g., a plastic base member) comprising a cavity configured to retain the contact lens and packaging solution and a flange region extending outwardly around the cavity. A cover (e.g., removable foil) that forms a liquid-tight seal with the base member, can be attached to the flange region to provide a sealed contact lens package. Such contact lens packages, which are commonly referred to as "blister packs", are well-known in the art (see e.g., U.S. Pat. No. 7,426,993).

It will be appreciated that conventional manufacturing methods can be used to manufacture the sealed contact lens package. In a method of manufacturing a contact lens package, the method can include the step of placing an unworn contact lens and a contact lens packaging solution in a receptacle, placing a cover on the receptacle, and sealing the cover on the receptacle. Generally, the receptacle is configured to receive a single contact lens and an amount of packaging solution sufficient to completely cover the contact lens, typically about 0.5-1.5 ml. The receptacle may be made from any suitable material, such as glass or plastic. In one example, the receptacle comprises a plastic base member comprising a cavity configured to retain the contact lens and packaging solution and a flange region extending outwardly around the cavity, and the cover comprises a removable foil attached to the flange region to provide the sealed contact lens package. The removable foil may be sealed by any conventional means such as heat sealing or gluing. In another example, the receptacle is in the form of a plastic base member comprising a plurality of threads and the cover comprises a plastic cap member comprising a compatible set of thread for engagement with the threads of the base member thereby providing a resealable cover. It will be appreciated that other types of packaging can also be used to provide a resealable package. For example, the contact lens package may comprise a plastic cover comprising features that engage with compatible features of the receptacle to form an interference fit. The method of manufacturing the sealed contact lens package may further comprise sterilizing the unworn contact lens by autoclaving the sealed contact lens package. Autoclaving generally involves subjecting the sealed contact lens package to temperatures of at least 121° C. for at least 20 minutes.

The contact lens can be provided unworn (i.e., a new contact lens, not having been previously used by a patient), immersed in the packaging solution and sealed in a package. The package may be a blister package, glass vial, or other appropriate container. The package comprises a base member having a cavity for accommodating a packaging solution and an unworn contact lens. The sealed package may be sterilized by sterilizing amounts of radiation, including heat or steam, such as by autoclaving, or by gamma radiation, e-beam radiation, ultraviolet radiation, etc.

In a specific example, the packaged contact lens is sterilized by autoclaving.

The final product can be a sterile, packaged contact lens (e.g., silicone hydrogel contact lens) having ophthalmically-acceptable surface wettability.

The hydrogel contact lens described herein can be used to correct vision of a symptomatic contact lens wearer. For example, the hydrogel contact lens can increase the duration of comfortable contact lens wearing time in a symptomatic contact lens wearer. References herein to a "symptomatic contact lens wearer" or "symptomatic subject" refers to a lens wearer that is classified as symptomatic using the method described in Example 5 below adapted from Young et al. (Young et al. *Characterizing contact lens-related dryness symptoms in a cross-section of UK soft lens wearers.* Contact Lens & Anterior Eye 34 (2011) 64-70).

The contact lens of the present invention can reduce symptoms of dryness and/or discomfort in a contact lens wearer.

The hydrogel contact lens described herein may be worn by a symptomatic contact lens wearer to reduce the sensation of "dryness" and/or discomfort, particularly at the end of the day compared to a control lens or the symptomatic wearer's habitual lenses. References herein to a "control lens" refer to a contact lens that contains no cooling agent and/or TRPV1 inhibitor but is otherwise identical to the cooling agent and/or TRPV1 inhibitor lens to which it is being compared. A reduction in the sensation of dryness and/or discomfort in symptomatic contact lens wearers can be determined in a clinical study. Overall lens preference for the hydrogel contact lens in symptomatic contact lens wearers is another way to measure/ascertain its beneficial impact on contact lens discomfort/dryness.

The hydrogel contact lens described herein may result in reduced lens awareness and/or result in fewer "lens awareness events" during the day compared to a control lens. A reduction in lens awareness and/or lens awareness events during contact lens wear can be determined using a "lens awareness logger" as described by Read et al. (see Read et al., *Monitoring ocular discomfort using a wrist-mounted electronic logger.* Contact Lens and Anterior Eye Vol. 43 (2020) 476-483.

The hydrogel contact lens described herein may result in an increased tear film meniscus height (or tear meniscus height) compared to a control lens after wearing the lenses for 1 hour, 2 hours, 4 hours or more. Tear film meniscus height may be measured by optical coherence tomography (OCT) or other suitable method.

The hydrogel contact lens described herein can improve (i.e., lower) CLDEQ-8 scores in a lens wearer, for instance in a symptomatic lens wearer (see Chalmers et al., *Contact Lens Dry Eye Questionnaire*-8 (*CLDEQ*-8) *and opinion of contact lens performance.* Optom Vis Sci 2012; 89(10): 1435-1442.). Improvements in CLDEQ-8 score may be seen after 1 week of wearing the hydrogel contact lens, or after 2 weeks, or after 4 weeks.

As mentioned, some subjects may experience initial stinging/burning or cooling sensations after inserting the contact lens with the cooling agent present as part of the lens. This potentially initial unpleasant sensations may be reduced or avoided with the presence also of the TRPV1 inhibitor as part of the lens. Due to the TRPV1 inhibitor, the lens wearer can wear the contact lens without experiencing any initial insertion discomfort. A reduction in initial unpleasant sensations, such as within 30 minutes of lens insertion, may be demonstrated using a validated visual analog scale (VAS) in which a lens wearer records perceived discomfort on a linear scale with the left end of the scale representing "no discomfort" and the right end of the scale represent "most uncomfortable" (see Delgado et al. J Am Acad Orthop Surg Glob Res Rev. 2018 March; 2(3): e088). An improvement of at least 1 on a scale of 1 to 10 (i.e., equivalent to 1 cm on a traditional paper-based 10-cm line scale) when wearing the lens containing both the cooling agent and the TRPV1 inhibitor compared to a lens not containing the TRPV1 inhibitor but otherwise identical demonstrates a significant reduction in discomfort. In some examples, the improvement in VAS score is at least 2, at least 3, or at least 4 or more.

The following Examples illustrate certain aspects and advantages of the present invention, which should be understood not to be limited thereby.

Example 1. Preparation of WS12-Releasing Contact Lens

Silicone hydrogel contact lenses were prepared by curing the formulation for stenfilcon A in contact lens molds. The cured stenfilcon A was removed from the molds and extracted by immersing them for 215 minutes in ethanol (EtOH) containing WS12 (Tocris Bioscience) in the loading concentrations shown in Table 2. The lenses were removed from the EtOH and washed in DI water for approximately 6 minutes, followed by two exchanges of DI water for approximately 30 minutes each. The lenses were transferred to 6 mL glass vials containing 3 mL phosphate buffered saline at pH 7.5 (0.78 wt. % NaCl, 0.05 wt. % sodium phosphate monobasic, and 0.36 wt. % sodium phosphate dibasic), referred to herein as PBS. The vials were sealed and autoclaved.

Each autoclaved lens was transferred to a vial containing 3 mL EtOH and stored overnight on a 150 rpm shaker at room temperature to extract WS12 from the lens. The EtOH extracts and the PBS in which the lenses were autoclaved were submitted for analysis by HPLC (detection wavelength=250 nm) against calibration standards to determine the average amount of WS12 loaded into each lens (n=5) and whether the WS12 leaches from the lens during autoclave. Results are shown in Table 1.

TABLE 1

| Lens ID | WS12 loading concentration | Ave. WS12/lens | WS12 concentration in PBS packaging solution |
|---|---|---|---|
| A | 5 μg/mL | 0.42 μg | Not detected |
| B | 15 μg/mL | 1.28 μg | Not detected |
| C | 50 μg/mL | 4.30 μg | 0.05 μg/mL |

Silicone hydrogel contact lenses were prepared by curing the formulation for comfilcon A in contact lens molds and subjecting the lenses to the same extraction, hydration, and autoclave procedures as described above for lenses made with stenfilcon A except that a single WS12 concentration, 15 μg/mL, was used in the ethanol extraction step. The lenses (Lens D) were submitted for HPLC analysis of WS12 content and were shown to have an average WS12 uptake of 1.04 μg/lens.

Example 2. Release of WS12 from Contact Lenses During Lens Wear

Lens B from Example 1 was worn by a human subject for 1, 3, and 6 hours (n=2 for each time point). At the end of each lens wear duration, the lenses were extracted in EtOH using the method described in Example 1. Extracts were submitted for HPLC analysis to determine the residual amount of WS12 remaining in the lenses and the amount of WS12 released during wear was calculated. The average amount and percent of WS12 released during lens wear is shown in Table 2.

TABLE 2

| Time Point (hr) | Ave. amt. WS12 released per lens | Ave. percent WS12 released per lens |
|---|---|---|
| 1 | 0.22 μg/mL | 17% |
| 3 | 0.51 μg/mL | 40% |
| 6 | 0.69 μg/mL | 54% |

Example 3. In Vitro Release Method

In the in vitro release method contact lenses are removed from their containers and excess packaging solution is shaken off each lens. Each lens (n=3 for each time point) is transferred to a 6 mL glass vial containing 3 mL of 25 vol. % ethanol in PBS at 35° C. (EtOH release media). The vials are placed on a shaker at 125 rpm in a 35° C. incubator. At the 30 minute and 1-hour time points 2.5 ml of the EtOH release media is removed (i.e., from 30 minute and 1-hour-time point vials, respectively) and submitted for HPLC analysis. At the 1-hour time point, and subsequent time points (i.e., at 2 hr, 3 hr, 6 hr, 9 hr, 12 hr, and 16 hr) 2.5 ml of the EtOH release media is removed from each of the remaining vials and 2.5 ml fresh EtOH release media is added back to each vial. The cumulative WS12 release at each time point is calculated. For example, the 3-hour time point is the sum of the average amount of WS12 detected in the release media taken at the 1-hour, 2-hour, and 3-hour time points.

The above-described in vitro release method results in an in vitro release of WS12 from contact lenses that corresponds well with the release of WS12 from contact lenses worn on eye as shown in Table 3 in comparison with Table 2.

TABLE 3

| Time Point (hr) | Lens B Ave. amt. WS12 released per lens | Lens B Ave. percent WS12 released per lens |
|---|---|---|
| 0.5 | 0.13 μg | 9% |
| 1 | 0.24 μg | 17% |
| 3 | 0.44 μg | 31% |
| 6 | 0.60 μg | 43% |

Example 4. Dose-Escalating, One-Day Clinical Study of WS12-Releasing Contact Lenses Two subjects were recruited into the study in which all three loading concentrations from Example 1 were evaluated. Each subject was exposed to Lens A, B and C from Example 1 for 30 minutes each in one eye, worn contralaterally. On the first study day, the subjects were exposed to contralateral wear of Lens B and Lens C, followed by contralateral wear of Lens B and Lens A on a separate day. With Lens C, one subject experienced a stinging sensation, while the other subject experienced a cooling sensation. With Lens B both subjects experienced a mild cooling/tingling sensation that lasted approximately one hour. Lens A elicited a brief cooling/wetting sensation in the subjects. Lens B was selected for further evaluation.

Example 5. Thirty-Day Clinical Study of WS12-Releasing Contact Lenses

Thirty-three subjects were enrolled in a 1-month, bilateral, randomized, crossover double-masked study where subjects wore both Lens B from Example 1 (test) or MyDay® brand (control) contact lenses, each for 1-month. The subjects were classified as either symptomatic (S) or asymptomatic (A) contact lens wearers using the classification system outlined in Table 4, which is adapted from the classification proposed by Young et al. (supra).

TABLE 4

| | | Frequency of contact lens dryness/discomfort | | | | |
|---|---|---|---|---|---|---|
| | | Never | Rarely | Sometimes | Frequently | Constantly |
| Intensity of contact lens dryness discomfort | Never have it 0 | A | A | A | A | A |
| | Not at all intense 1 | A | A | A | A | A |
| | 2 | A | A | S | S | S |
| | 3 | A | A | S | S | S |
| | 4 | A | A | S | S | S |
| | Very intense 5 | A | A | S | S | S |

Sixteen of the subjects were classified as symptomatic contact lens wearers, reporting a rating of 2 or more out of 5 for Intensity of contact lens dryness/discomfort and "sometimes, frequently or constantly" for Frequency of contact lens dryness/discomfort. Seventeen of the subjects were classified as asymptomatic contact lens wearers, reporting a rating of 0 or 1 out of 5 for Intensity of contact lens dryness/discomfort and "rarely or never" for Frequency of contact lens dryness/discomfort.

After a washout period of 3-7 days during which subjects wore their habitual lenses, the second lens type from the randomization order (i.e., either the Example 1 (test) or MyDay® brand (control) contact lenses) were worn for 1-month. Ratings of comfort, dryness, cooling, pleasantness as well as CLDEQ-8 score were monitored (see Chalmers et al., supra).

At the 1-week time point, the test lens was rated as significantly less pleasant at insertion than the control lens, however this difference decreased after 1 month of wear. This change may be attributed to a decrease in cooling sensation, possibly due to sensory adaptation in subjects wearing the test lens. There was no significant difference in the rating of overall comfort between test and control lenses at the 1-week or 1-month time points. Yet, twice as many subjects reported an increase in comfort with the test lens compared to the control lens after 1 month of wear. There was significantly better (i.e., lower) overall dryness ratings at both 1 week and 1 month with the test lens compared to the control lens. Tear meniscus height was measured using a Visante OCT (Carl Zeiss Meditec Inc., Dublin, Calif.) and was significantly increased after one month of wearing the test lens compared to the control lens. The CLDEQ-8 score was significantly lower after 1 month of wearing the test lens compared to the control lens. The difference was statistically significant among symptomatic subjects. After 1 month of lens wear, out of the 33 subjects, 19 (58%) preferred the test lens, 11 (33%) preferred the control lens and 3 (9%) reported no preference. Among the 16 symptomatic subjects, 11 (69%) preferred the test lens and 5 (31%) preferred the control lens. Results are depicted in FIG. 1.

The present invention includes the following aspects/embodiments/features in any order and/or in any combination:

1. The present invention relates an unworn sterile hydrogel contact lens immersed in a packaging solution and sealed in a package, said contact lens comprising:

a) a polymeric lens body;
b) an amount of a cooling agent releasably adhered to the polymeric lens body; and
c) an amount of a TRPV1 inhibitor either releasably adhered to the polymeric lens body or present in the packaging solution or both.

2. The unworn sterile hydrogel contact lens or other embodiment of any preceding or following embodiment/feature/aspect, wherein the cooling agent is a TRPM8 agonist.

3. The unworn sterile hydrogel contact lens or other embodiment of any preceding or following embodiment/feature/aspect, wherein the TRPV1 inhibitor is oleic acid, alpha-lipoic acid, L-carnitine, resveratrol, hyaluronic acid, palmitoylethanolamide, petroselinic acid, naringenin, asivatrep, AMG517, ABT102, GRC 6211, SB-705498, or MK-2295, and the cooling agent is icilin, menthol, a menthol derivative, a carboxamide, WS-148, WS-30, WS-11, CPS-113, CPS-369, frescolat ML, frescolat MGA, Cooling-agent 10, PMD-38, geraniol, linalool, eucalyptol, hydroxy-citronellal, AG3-5, 5-methyl-4-(1-pyrrolidinyl)-3[2H]-furanone, 4,5-methyl-3-(1-pyrrolidinyl)-2-[5H]-furanone, vanillyl butyl ether, peppermint oil, methane carboxamide ethyl pyridine, menthoxypropanediol, menthanediol, cyanomethylphenyl menthane carboxamide, camphor, ethyl menthane carboxamide, menthyl diisopropyl propionamide, menthyl lactate, 4-(butoxymenthyl)-2-methoxy-phenol, 3-[[5-methyl-2-(1-methyl)cyclohexyl]oxy]-1,2-propanediol, isopulegol, or any mixture or combination thereof.

4. The unworn sterile hydrogel contact lens or other embodiment of any preceding or following embodiment/feature/aspect, wherein the cooling agent comprises a TRPM8 agonist and the TRPV1 inhibitor comprises oleic acid.

5. The unworn sterile hydrogel contact lens or other embodiment of any preceding or following embodiment/feature/aspect, wherein the cooling agent comprises WS12 and the TRPV1 inhibitor comprises oleic acid.

6. The unworn sterile hydrogel contact lens or other embodiment of any preceding or following embodiment/feature/aspect, wherein the TRPV1 inhibitor is releasably adhered to the polymeric lens body.

7. The unworn sterile hydrogel contact lens or other embodiment of any preceding or following embodiment/feature/aspect, wherein the TRPV1 inhibitor has a first in vitro release profile and the cooling agent has a second in vitro release profile, and the first release profile is faster than the second release profile, based on percent of total loaded amount of the TRPV1 inhibitor and the cooling agent released in an initial 1 to 3 hours of release.

8. The unworn sterile hydrogel contact lens or other embodiment of any preceding or following embodiment/feature/aspect, wherein the first release profile releases a majority of the total loaded amount of the TRPV1 inhibitor in the initial 1 to 3 hours of release and the second release profile releases less than a majority of the total loaded amount of the cooling agent in the same initial 1 to 3 hours of release.

9. The unworn sterile hydrogel contact lens or other embodiment of any preceding or following embodiment/feature/aspect, wherein the cooling agent has an in vitro release profile of 0.01 μg to 10 μg of the cooling agent after 1 hour in a release media consisting of 25 vol. % EtOH in PBS.

10. The unworn sterile hydrogel contact lens or other embodiment of any preceding or following embodiment/feature/aspect, wherein the amount of the cooling agent releasably adhered to the polymeric lens body is from about 0.25 μg to 10 μg.

11. The unworn sterile hydrogel contact lens or other embodiment of any preceding or following embodiment/feature/aspect, wherein the amount of the cooling agent releasably adhered to the polymeric lens body is from about 0.5 μg to 5 μg.

12. The unworn sterile hydrogel contact lens or other embodiment of any preceding or following embodiment/feature/aspect, wherein the second release profile comprises release of 0.05 μg to 0.5 μg of the cooling agent per hour for up to 6 hours.

13. The unworn sterile hydrogel contact lens or other embodiment of any preceding or following embodiment/feature/aspect, wherein the second release profile comprises release of 0.1 μg to 0.3 μg of the cooling agent per hour for up to 6 hours.

14. The unworn sterile hydrogel contact lens or other embodiment of any preceding or following embodiment/feature/aspect, wherein the TRPV1 inhibitor has a release profile in a release media consisting of 25 vol % EtOH in PBS comprising release of 2 μg to 25 μg TRPV1 inhibitor at 1 hour.

15. The unworn sterile hydrogel contact lens or other embodiment of any preceding or following embodiment/feature/aspect, wherein the first release profile comprises release of from 3 to 20 μg of the TRPV1 inhibitor per hour for at least 9 hours in the release media.

16. The unworn sterile hydrogel contact lens or other embodiment of any preceding or following embodiment/feature/aspect, wherein the polymeric lens body is a reaction product of a polymerizable composition comprising at least one siloxane monomer and at least one hydrophilic monomer or at least one hydrophilic polymer or both at least one hydrophilic monomer and at least one hydrophilic polymer.

17. The unworn sterile hydrogel contact lens or other embodiment of any preceding or following embodiment/feature/aspect, wherein the polymeric lens body is fanfilcon A, comfilcon A, somofilcon A, riofilcon A, or stenfilcon A.

18. The unworn sterile hydrogel contact lens or other embodiment of any preceding or following embodiment/feature/aspect, wherein the polymeric lens body is a reaction product of a polymerizable composition comprising from 25 wt. % to 55 wt. % of a siloxane monomer or a combination of siloxane monomers, from 30 wt. % to 55 wt. % of a vinyl monomer selected from NVP, VMA, or combinations thereof, and optionally from about 1 wt. % to about 20 wt. % of a hydrophilic monomer selected from N,N-dimethylacrylamide (DMA), 2-hydroxyethyl methacrylate (HEMA), ethoxyethyl methacrylamide (EOEMA), or ethylene glycol methyl ether methacrylate (EGMA), or any combination thereof, and optionally from about 1 wt. % to about 20 wt. % of a hydrophobic monomer selected from methyl methacrylate (MMA), isobornyl methacrylate (IBM), or 2-hydroxybutyl methacrylate (HOB) or any combination thereof.

19. The unworn sterile hydrogel contact lens or other embodiment of any preceding or following embodiment/feature/aspect, wherein the cooling agent is WS12.
20. The unworn sterile hydrogel contact lens or other embodiment of any preceding or following embodiment/feature/aspect, wherein the package is autoclaved.
21. The unworn sterile hydrogel contact lens or other embodiment of any preceding or following embodiment/feature/aspect, wherein the package comprises:
    a) a base member having a cavity that retains the packaging solution; and
    b) a cover that forms a liquid-tight seal with the base member.
22. The present invention further relates to use of the unworn sterile hydrogel contact lens of any preceding or following embodiment/feature/aspect, for correcting vision of a symptomatic contact lens wearer.
23. The use or other embodiment of any preceding or following embodiment/feature/aspect, for reducing symptoms of dryness in the contact lens wearer.
24. The use or other embodiment of any preceding or following embodiment/feature/aspect, for increasing comfortable lens wearing time by the contact lens wearer.
25. The use or other embodiment of any preceding or following embodiment/feature/aspect, for increasing tear meniscus height of the contact lens wearer.
26. The use or other embodiment of any preceding or following embodiment/feature/aspect, for lowering CLDEQ-8 scores in the lens wearer.
27. The present invention further relates to a method of manufacturing the contact lens of preceding or following embodiment/feature/aspect, said method comprising:
    (a) polymerizing a polymerizable composition in a contact lens mold to obtain the polymeric lens body;
    (b) removing the polymeric lens body from said contact lens mold;
    (c) extracting, in one or more steps, the polymeric lens body in at least a first organic solvent comprising the cooling agent, the TRPV1 inhibitor, or both;
    (d) hydrating the polymeric lens body in a hydration liquid to obtain a hydrogel contact lens;
    (e) sealing said hydrogel contact lens with packaging solution in a package; and
    (f) autoclaving said package.
28. The method or other embodiment of any preceding or following embodiment/feature/aspect, wherein step (c) comprises extracting the polymeric lens body in the first organic solvent comprising the cooling agent and the TRPV1 inhibitor.
29. The method or other embodiment of any preceding or following embodiment/feature/aspect, wherein step (c) comprises extracting the polymeric lens body in the first organic solvent comprising the cooling agent and then extracting in a second organic solvent comprising the TRPV1 inhibitor.
30. The method or other embodiment of any preceding or following embodiment/feature/aspect, wherein the method further comprises including the TRPV1 inhibitor in the packaging solution prior to said sealing.
31. The unworn sterile hydrogel contact lens or other embodiment of any preceding or following embodiment/feature/aspect, wherein the polymeric lens body has a concave surface and convex surface, and the TRPV1 inhibitor is present on the concave surface at a greater concentration compared to the cooling agent.
32. The use or other embodiment of any preceding or following embodiment/feature/aspect, for correcting vision of a symptomatic contact lens wearer, wherein any stinging sensation from the cooling agent is blocked or reduced by the TRPV1 inhibitor.

The present invention can include any combination of these various features or embodiments above and/or below as set forth in sentences and/or paragraphs. Any combination of disclosed features herein is considered part of the present invention and no limitation is intended with respect to combinable features.

The disclosure herein refers to certain illustrated examples, it is to be understood that these examples are presented by way of example and not by way of limitation. The intent of the foregoing detailed description, although discussing exemplary examples, is to be construed to cover all modifications, alternatives, and equivalents of the examples as may fall within the spirit and scope of the invention as defined by the additional disclosure.

References herein to “an example” or “a specific example” or “an aspect” or “an embodiment” or similar phrase, are intended to introduce a feature or features of the contact lens or components thereof, the sealed contact lens package or components thereof, or method of manufacturing the contact lens (depending on context) that can be combined with any combination of previously-described or subsequently-described examples, aspects, embodiments (i.e. features), unless a particular combination of features is mutually exclusive, or if context indicates otherwise. Further, as used in this specification, the singular forms “a,” “an,” and “the” include plural referents (e.g., at least one or more) unless the context clearly dictates otherwise. Thus, for example, reference to a “contact lens” includes a single lens as well as two or more of the same or different lenses.

The entire contents of all cited references in this disclosure, to the extent that they are not inconsistent with the present disclosure, are incorporated herein by reference.

The present invention can include any combination of the various features or embodiments described above and/or in the claims below as set forth in sentences and/or paragraphs. Any combination of disclosed features herein is considered part of the present invention and no limitation is intended with respect to combinable features.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. An unworn sterile hydrogel contact lens immersed in a packaging solution and sealed in a package, said contact lens comprising:

a) a polymeric lens body;

b) an amount of a cooling agent releasably adhered to the polymeric lens body; and c) an amount of a TRPV1 inhibitor either releasably adhered to the polymeric lens body or present in the packaging solution or both, wherein the TRPV1 inhibitor has a first in vitro release profile and the cooling agent has a second in vitro release profile, and the first release profile is faster than the second release profile, based on percent of total loaded amount of the TRPV1 inhibitor and the cooling agent released in an initial 1 to 3 hours of release.

2. The unworn sterile hydrogel contact lens of claim 1, wherein the cooling agent is a TRPM8 agonist.

3. The unworn sterile hydrogel contact lens of claim 1, wherein the TRPV1 inhibitor is oleic acid, alpha-lipoic acid, L-carnitine, resveratrol, hyaluronic acid, palmitoylethanolamide, petroselinic acid, naringenin, asivatrep, AMG517, ABT102, GRC 6211, SB-705498, or MK-2295, and the cooling agent is icilin, menthol, a menthol derivative, a carboxamide, WS-148, WS-30, WS-11, CPS-113, CPS-369, frescolat ML, frescolat MGA, Cooling-agent 10, PMD-38, geraniol, linalool, eucalyptol, hydroxycitronellal, AG3-5, 5-methyl-4-(1-pyrrolidinyl)-3 [2H]-furanone, 4,5-methyl-3-(1-pyrrolidinyl)-2-[5H]-furanone, vanillyl butyl ether, peppermint oil, methane carboxamide ethyl pyridine, menthoxypropanediol, menthanediol, cyanomethylphenyl menthane carboxamide, camphor, ethyl menthane carboxamide, menthyl diisopropyl propionamide, menthyl lactate, 4-(butoxymenthyl)-2-methoxy-phenol, 3-[[5- methyl-2-(1-methyl) cyclohexyl]oxy]-1,2-propanediol, isopulegol, or any mixture or combination thereof.

4. The unworn sterile hydrogel contact lens of claim 1, wherein the cooling agent comprises a TRPM8 agonist and the TRPV1 inhibitor comprises oleic acid.

5. The unworn sterile hydrogel contact lens of claim 1, wherein the cooling agent comprises WS12 and the TRPV1 inhibitor comprises oleic acid.

6. The unworn sterile hydrogel contact lens of claim 1, wherein the TRPV1 inhibitor is releasably adhered to the polymeric lens body.

7. The unworn sterile hydrogel contact lens of claim 1, wherein the first release profile releases a majority of the total loaded amount of the TRPV1 inhibitor in the initial 1 to 3 hours of release and the second release profile releases less than a majority of the total loaded amount of the cooling agent in the same initial 1 to 3 hours of release.

8. The unworn sterile hydrogel contact lens of claim 1, wherein the cooling agent has an in vitro release profile of 0.01 μg to 10 μg of the cooling agent after 1 hour in a release media consisting of 25 vol. % EtOH in PBS.

9. The unworn sterile hydrogel contact lens of claim 1, wherein the amount of the cooling agent releasably adhered to the polymeric lens body is from about 0.25 μg to 10 μg.

10. The unworn sterile hydrogel contact lens of claim 1, wherein the amount of the cooling agent releasably adhered to the polymeric lens body is from about 0.5 μg to 5 μg.

11. The unworn sterile hydrogel contact lens of claim 1, wherein the second release profile comprises release of 0.05 μg to 0.5 μg of the cooling agent per hour for up to 6 hours.

12. The unworn sterile hydrogel contact lens of claim 1, wherein the second release profile comprises release of 0.1 μg to 0.3 μg of the cooling agent per hour for up to 6 hours.

13. The unworn sterile hydrogel contact lens of claim 1, wherein the TRPV1 inhibitor has a release profile in a release media consisting of 25 vol % EtOH in PBS comprising release of 2 μg to 25 μg TRPV1 inhibitor at 1 hour.

14. The unworn sterile hydrogel contact lens of claim 1, wherein the first release profile comprises release of from 3 to 20 μg of the TRPV1 inhibitor per hour for at least 9 hours in the release media.

15. The unworn sterile hydrogel contact lens of claim 1, wherein the polymeric lens body is a reaction product of a polymerizable composition comprising at least one siloxane monomer and at least one hydrophilic monomer or at least one hydrophilic polymer or both at least one hydrophilic monomer and at least one hydrophilic polymer.

16. The unworn sterile hydrogel contact lens of claim 1, wherein the polymeric lens body is fanfilcon A, comfilcon A, somofilcon A, riofilcon A, or stenfilcon A.

17. The unworn sterile hydrogel contact lens of claim 1, wherein the polymeric lens body is a reaction product of a polymerizable composition comprising from 25 wt. % to 55 wt. % of a siloxane monomer or a combination of siloxane monomers, from 30 wt. % to 55 wt. % of a vinyl monomer selected from NVP, VMA, or combinations thereof, and optionally from about 1 wt. % to about 20 wt. % of a hydrophilic monomer selected from N,N-dimethylacrylamide (DMA), 2-hydroxyethyl methacrylate (HEMA), ethoxyethyl methacrylamide (EOEMA), or ethylene glycol methyl ether methacrylate (EGMA), or any combination thereof, and optionally from about 1 wt. % to about 20 wt. % of a hydrophobic monomer selected from methyl methacrylate (MMA), isobornyl methacrylate (IBM), or 2-hydroxybutyl methacrylate (HOB) or any combination thereof.

18. The unworn sterile hydrogel contact lens of claim 17, wherein the cooling agent is WS12.

19. The unworn sterile hydrogel contact lens of claim 1, wherein the package is autoclaved.

20. The unworn sterile hydrogel contact lens of claim 1, wherein the package comprises:

a) a base member having a cavity that retains the packaging solution; and b) a cover that forms a liquid-tight seal with the base member.

21. A method for correcting vision of a symptomatic contact lens wearer, said method comprising utilizing the unworn sterile hydrogel contact lens of claim 1 to correct vision in said symptomatic contact lens wearer.

22. The method of claim 21, wherein said method reduces symptoms of dryness in the symptomatic contact lens wearer.

23. The method of claim 21, wherein said method increases comfortable lens wearing time by the symptomatic contact lens wearer.

24. The method of claim 21, wherein said method increases tear meniscus height of the symptomatic contact lens wearer.

25. The method of claim 21, wherein said method lowers CLDEQ-8 scores in the symptomatic contact lens wearer.

26. A method of manufacturing the unworn sterile hydrogel contact lens of claim 1, said method comprising:

(a) polymerizing a polymerizable composition in a contact lens mold to obtain the polymeric lens body;

(b) removing the polymeric lens body from said contact lens mold;

(c) extracting, in one or more steps, the polymeric lens body in at least a first organic solvent comprising the cooling agent, the TRPV1 inhibitor, or both;

(d) hydrating the polymeric lens body in a hydration liquid to obtain a hydrogel contact lens;

(e) sealing said hydrogel contact lens with packaging solution in a package; and (f) autoclaving said package.

27. The method of claim 26, wherein step (c) comprises extracting the polymeric lens body in the first organic solvent comprising the cooling agent and the TRPV1 inhibitor.

28. The method of claim 26, wherein step (c) comprises extracting the polymeric lens body in the first organic solvent comprising the cooling agent and then extracting in a second organic solvent comprising the TRPV1 inhibitor.

29. The method of claim 26, wherein the method further comprises including the TRPV1 inhibitor in the packaging solution prior to said sealing.

30. The unworn sterile hydrogel contact lens of claim 1, wherein the polymeric lens body has a concave surface and convex surface, and the TRPV1 inhibitor is present on the concave surface at a greater concentration compared to the cooling agent.

31. A method for correcting vision of a symptomatic contact lens wearer, said method comprising wearing the unworn sterile hydrogel contact lens of claim 1, and wherein any stinging sensation from the cooling agent is blocked or reduced by the TRPV1 inhibitor.

32. The unworn sterile hydrogel contact lens of claim 1, wherein the cooling agent comprises WS12.

* * * * *